(12) United States Patent
Kemp

(10) Patent No.: US 6,446,301 B1
(45) Date of Patent: Sep. 10, 2002

(54) INTERIOR WINDSHIELD WIPER

(76) Inventor: John Kemp, 54 Berkshire Rd., Holbrook, NY (US) 11741

( * ) Notice: Subject to any disclaimer, the term of this patent is extended or adjusted under 35 U.S.C. 154(b) by 0 days.

(21) Appl. No.: 09/557,340

(22) Filed: Apr. 25, 2000

(51) Int. Cl.[7] .............................. B60S 1/20; B60S 1/44; B60S 1/30
(52) U.S. Cl. .............................. 15/250.29; 15/250.28; 15/250.24
(58) Field of Search ........................ 15/250.28, 250.29, 15/250.003, 250.002, 250.18, 250.24, 250.48

(56) References Cited

U.S. PATENT DOCUMENTS

| | | |
|---|---|---|
| 158,967 A | 1/1875 | Mundy |
| 1,338,002 A | 4/1920 | Derry |
| 1,429,280 A | 9/1922 | Godfrey |
| 1,689,214 A | 10/1928 | Small |
| 1,907,171 A | 5/1933 | Anderson |
| 2,443,491 A | 6/1948 | Andres ........................ 542/695 |
| 3,866,258 A | 2/1975 | DeGraw ................... 15/250.29 |
| 4,023,422 A | 5/1977 | Jou ................. 74/70 |
| 4,037,287 A | 7/1977 | Whittaker ................. 15/257 R |
| 4,212,091 A | 7/1980 | Jones ........................ 15/250 B |
| 5,105,501 A | 4/1992 | Douglas ................... 15/250.28 |
| 5,515,570 A | 5/1996 | Muscroft ................... 15/220.2 |
| 6,092,259 A * | 7/2000 | Reppert .................... 15/250.28 |

FOREIGN PATENT DOCUMENTS

| | | | | |
|---|---|---|---|---|
| DE | 2203269 | * | 5/1979 | .............. 15/250.29 |
| FR | 1303305 | * | 7/1962 | .............. 15/250.29 |
| GB | 142350 | * | 5/1920 | .............. 15/250.34 |
| JP | 112344 | * | 9/1981 | .............. 15/250.24 |
| JP | 61350 | * | 4/1985 | .............. 15/250.24 |

* cited by examiner

Primary Examiner—Gary K. Graham
(74) Attorney, Agent, or Firm—Alfred M. Walker

(57) ABSTRACT

A laterally movable wiper arm assembly cleans curved interior surfaces of automobile and truck windshields. The wiper blade is movable on two curved tracks; one at the top of the windshield and one at the bottom of the windshield, with a vertically oriented telescoping wiper blade movable laterally therebetween. The telescoping arm support permits the vertical blade to tilt into the corners at the bottom of the windshield, to cover a larger proportion of the area, since the bottom of a windshield is longer than the top. The blade or wiping pad is supported with a resilient foam layer attached to a flexible substrate, which is adjustably attached to a rigid support arm following the windshield contour.

15 Claims, 4 Drawing Sheets

INTERIOR WINDSHIELD WIPER

FIELD OF THE INVENTION

The present invention relates to a windshield wiper for the inside of an automobile windshield.

BACKGROUND OF THE INVENTION

Various devices are known for cleaning both sides of a window, such as an automobile windshield.

U.S. Pat. Nos. 4,023,422 of Jou, U.S. Pat. No. 5,105,501 of Douglas and U.S. Pat. No. 1,689,214 of Small all describe devices which clean the interior of a vehicle windshield.

However Jou '422 requires a complicated joining pivoting apparatus under the windshield to move the exterior and interior wipers simultaneously. Douglas '501 uses magnets to pull the interior wiper by means of the outer wipers motive force and Small '214 uses radially pivoting wipers on a flat, old fashioned windshield, not a laterally movable wiper blade crossing a concave interior surface of a windshield. U.S. Pat. No. 5,515,570 of Muscroft also describes a magnetic, two-sided window cleaner.

Window cleaners with a wiper movable on a pair of parallel tracks, are described in devices which clean flat rear view mirrors, especially for trucks, as in U.S. Pat. Nos. 3,866,258 of DeGraw and U.S. Pat. No. 4,212,091 of Jones. U.S. Pat. No. 1,338,002 of Derry uses tracks for cleaning flat windows.

However, because of variations in windshield height in the middle as opposed to the side corners, the aforementioned devices for cleaning flat surfaces cannot clean curved interior surfaces of automobile and truck windshields.

OBJECTS OF THE INVENTION

It is an object of the present invention to provide a windshield wiper for the inside of an automobile windshield.

It is also an object of the present invention to provide a devices are known for cleaning both sides of a window, such as an automobile windshield.

It is also an object of the present invention to provide a because of variations in windshield height in the middle as opposed to the side corners, the aforementioned devices for cleaning flat surfaces cannot clean curved interior surfaces of automobile and truck windshields.

It is also an object of the present invention to provide a for a motorized version and one for a manually sweepable version. The wiper blade is movable on two curved tracks; one at the top of the windshield and one at the bottom of the windshield, with a vertically oriented wiper blade movable laterally therebetween.

It is also an object of the present invention to provide a motorized version and one for a manually sweepable version. The wiper blade is movable on two curved tracks; one at the top of the windshield and one at the bottom of the windshield, with a vertically oriented wiper blade movable laterally therebetween.

It is also an object of the present invention to provide a motorized version and one for a manually sweepable version. The wiper blade is movable on two curved tracks; one at the top of the windshield and one at the bottom of the windshield, with a vertically oriented wiper blade movable laterally therebetween.

It is also an object of the present invention to provide a some telescoping to the wiper arm support.

It is also an object of the present invention to provide a minimize any impediment to driver peripheral view.

It is also an object of the present invention to provide an aftermarket kit to be installed by a car or truck owner.

It is also an object of the present invention to improve over the disadvantages of the prior art.

SUMMARY OF THE INVENTION

The present invention is a laterally movable wiper arm assembly for cleaning curved interior surfaces of automobile and truck windshields.

The present invention includes two embodiments: one, for a motorized version and one for a manually sweepable version. The wiper blade is movable on two curved tracks; one at the top of the windshield and one at the bottom of the windshield, with a vertically oriented wiper blade movable laterally therebetween.

A key important detail is that in order to accommodate the fact that some windshields are shortest in the middle and widest at the side corners or vice-versa, there has to be some telescoping to the wiper arm support.

Another reason for the telescoping arm support is to permit the essentially vertical blade to tilt into the corners at the bottom of the windshield to cover a larger proportion of the area since the bottom of a windshield is longer than the top.

Special attention is given to the problem of maintaining contact with the concave inside surface of the windshield. The blade or wiping pad is supported with a resilient foam layer attached to a flexible substrate which is adjustably attached to a rigid support arm in such a manner as to follow the windshield contour.

The windshield wiper mechanism is designed so that the arm is always parked at the passenger side when not cycling. This is to minimize any impediment to driver peripheral view. By being at the opposite end of the windshield, the wiper blade assembly simply merges into the windshield pillar from the driver's viewpoint.

A manually operable device uses a handle.

This invention is described in detail as an aftermarket kit to be installed by a car or truck owner. It is obvious that a similar function can be served by a factory-installed option on a new vehicle.

The same general features and design would be applicable, however minor details such as mounting hardware and track construction can be modified to reduce part cost and installation labor by professionals at assembly time since these details would apply to a custom design for a specific vehicle model.

BRIEF DESCRIPTION OF THE DRAWINGS

The present invention can best be understood in connection with the accompanying drawings, in which.

DETAILED DESCRIPTION OF THE INVENTION

Since the interior wiper of this invention should only encounter mist, very little pressure against the windshield is required. While a conventional rubber wiper blade can be used, equally effective is an absorbent fabric pad configured into a narrow blade-like shape. With little pressure there is consequently little frictional drag against the windshield. Furthermore, with judicious attention to drive line friction, lightweight components and modest power requirements are the resulting design parameters.

Figure 1:
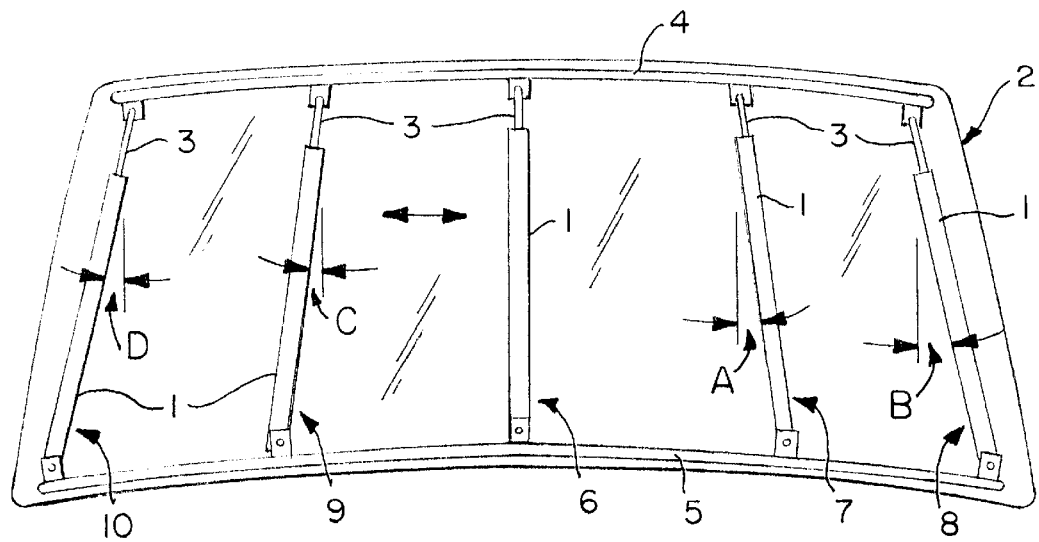
FIG. 1 is an Interior front elevation view showing the wiper of this invention in various positions on the windshield.

FIG. 1 is an interior view of a typical windshield 2 with the wiper assembly 1 of this invention in various positions along its cyclic motion. Part 3 is the telescoping extension. Wiper assembly 1 rides in top track 4 and bottom track 5. Track 5 is approximately 25 percent longer than track 4 for a typical windshield. In position 6 at the center, wiper 1 is vertical. As wiper 1 goes right to position 7, wiper 1 starts to tilt out (angle A) and wiper 1 pivots slightly both at the top and bottom. At the end of the stroke to the right at position 8, wiper 1 is tilted to its maximum angle B. Similarly, at positions 9 and 10, wiper 1 tilts in the opposite direction (angles C and D) to cover most of the windshield area.

Figure 2:
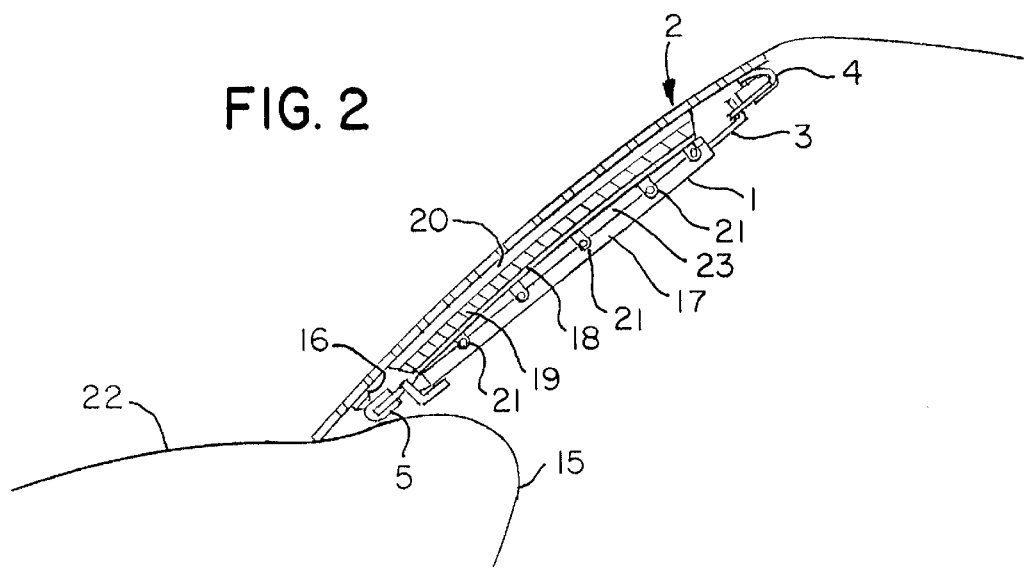
FIG. 2 is a Side view with the windshield shown in cross section.

The side view of FIG. 2 reveals some of the details that insure intimate contact of wiper blade pad 20 with the concave inner surface of windshield 2. A portion 22 of the vehicular hood is shown. Blade pad 20 is attached to a layer 20 of resilient foam, which conforms to minor concavity variations as wiper 1 moves across windshield 2. Attachment tabs 21 on flexible semi-rigid substrate 18 are adjusted through screw attachment to rigid wiper support 17 so as to optimize the contour to match windshield 2 concavity at mid stroke. Arched shape 23 provided between rigid wiper support 17 and semi-rigid substrate 18 results from this adjustment.

Figure 3:
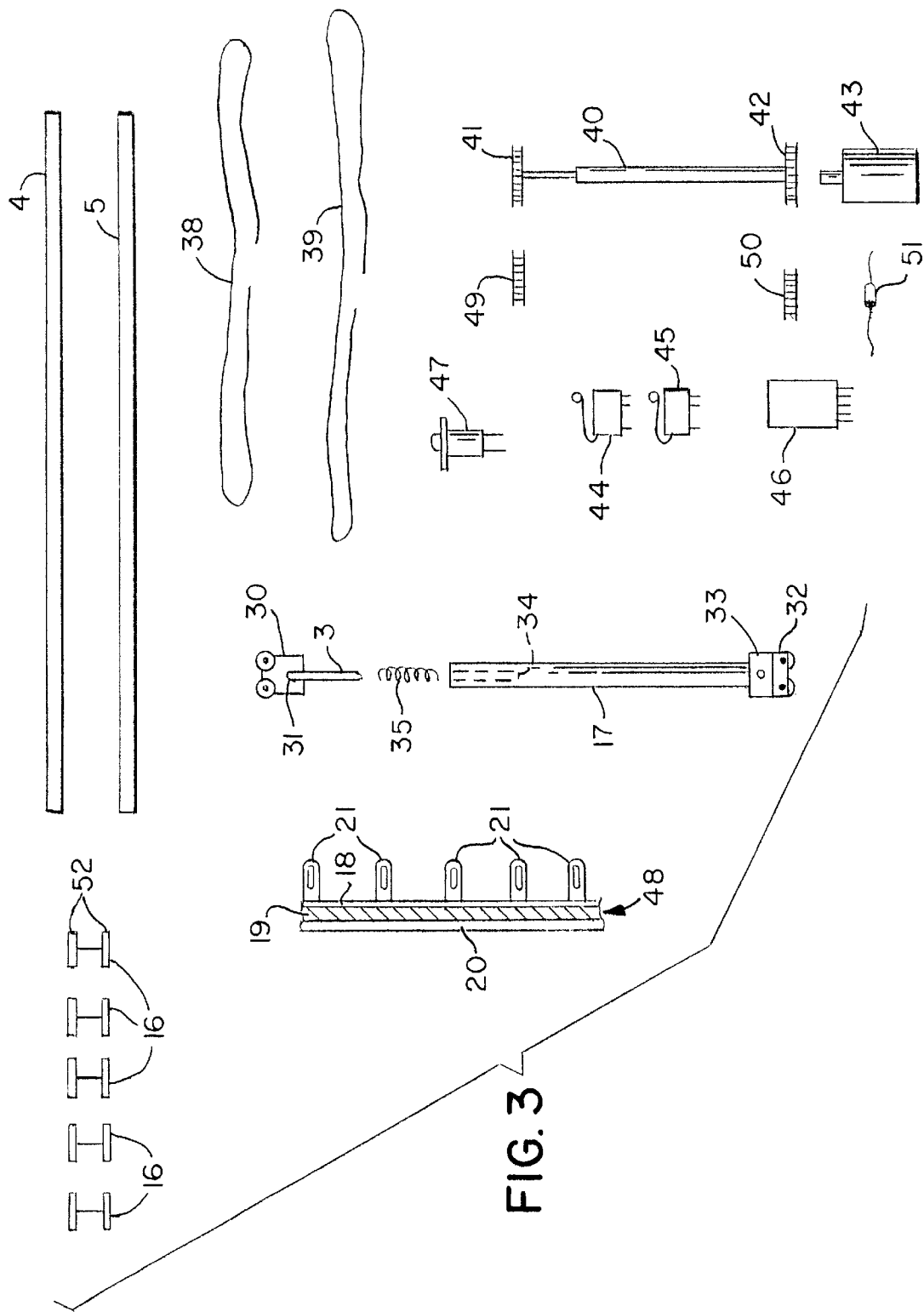
FIG. 3 shows Top and side views of the various parts of an after market embodiment for an installation kit of the present invention.

FIG. 3 shows the various parts that make up an installation kit of this invention. Standoffs 16 shaped like short I-beam sections are used to mount bottom track 5 spaced a small distance away from windshield 2 surface (as in FIG. 2) to minimize interference with the flow of defrosting air from the vehicle system. An alternative attachment (not shown) is to dashboard surface 15. Surfaces 52 of standoffs 16 are covered with adhesive patches to facilitate attachment of bottom rail 5 with u-shaped cross section after it is cut to size. Upper rail 4 with u-shaped cross section is cut to size and is adhesively bonded to the inner surface of windshield 2 using high bond "double sticky" foam core tape. A side view of blade subassembly 48 shows a better view of the contour adjusting slots in tabs 21. These are attached to the sides of rigid wiper support 17 with screws (not shown).

Telescoping extension 3 is attached to top track plate 30 with two wheels at pivot point 31. Compression spring 35 fits in cavity 34 and insures that support bar 17 is in intimate track guidance contact at all times by providing force against top rail 4 and bottom rail 5.

Bottom track plate 32 with two wheels is attached to support 17 at pivot point 33. Two timing belt segments 38 and 39 to be trimmed to fit are included. Timing belt idler pulleys 49 and 50 are mounted to the track ends at the driver side with brackets (not shown).

Telescoping drive shaft 40, which is non-circular cross section, is attached to a top timing belt drive pulley 41 and a bottom timing belt drive pulley at least 20 percent larger in effective diameter. Drive shaft 40 typically has hexagonal or square cross sectional tubing sections. The telescoping feature of shaft 40 is used to accommodate windshields of a large variety of cars and trucks, which differ significantly in nominal height. DC permanent magnet (PM) gear motor 43, limit switches 44 and 45, push button 47, reversing relay 46, and diode 51 are the electrical components.

Figure 4:
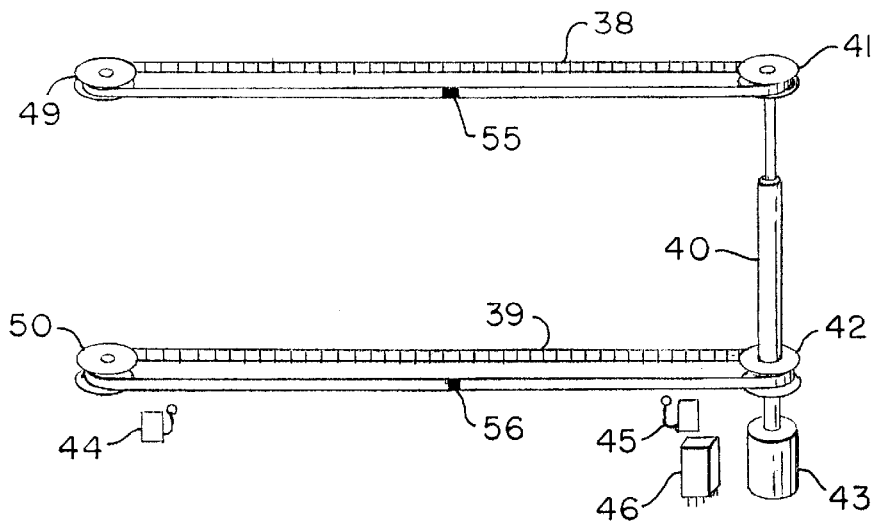
FIG. 4 is a Perspective view of the drive components thereof.

FIG. 4 shows the drive configuration. Drive motor 43 and shaft 40 are placed at the passenger side of the windshield while respective idler pulleys 49 and 50 for respective belts 38 and 39 are at the driver end. Attachment point 55 of belt 38 is attached to and drives top plate 30 while attachment point 56 is attached to and drives bottom plate 32.

The use of timing belts and pulleys and top and bottom drive through telescoping shaft 40 insures synchronism of the drive system with no chance of slippage. Larger pulley 42 drives belt 39 a greater distance than belt 38 with each motor 43 revolution. Belts 38, 39 are attached and adjusted at midstroke with wiper assembly 1 in a vertical position. Deviations from the center in either direction tilt wiper assembly 1 in the desired direction to tilt into the bottom corners of the windshield to wipe.

Limit switch 44 is mounted to detect the arrival of wiper assembly 1 at the end of the stroke at the driver's side. Relay 46 is used for motor reversal and limit switch 45 is used to detect the arrival of the wiper assembly 1 at the passenger side.

Figure 5:
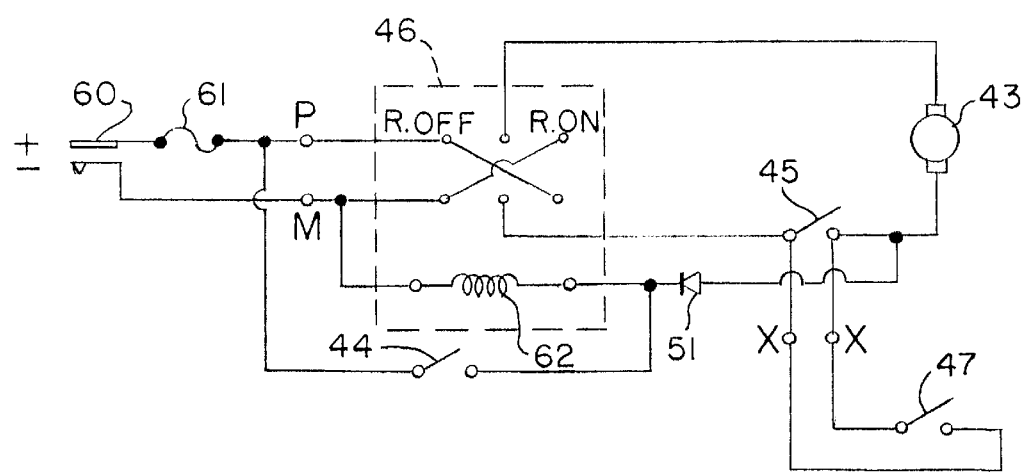
FIG. 5 is a Circuit diagram for a motorized embodiment of the present invention.

FIG. 5 shows a schematic diagram of the electrical subsystem. In operation, wiper 1 is parked at the passenger side. The driver presses push button 47 for about at least a half second but not longer than three seconds. An automatic sequence commences with wiper 1 sweeping across to the end of the stroke at the driver side, then reverses direction and sweeps all the way to the passenger side, then shuts down.

The circuit operates as follows. Plug 60 is provided to operate the wiper accessory from the cigarette lighter outlet; direct connection to accessory terminals under the dashboard is an alternative. Fuse 61 is a safety feature. With coil 62 of relay 46 de-energized, motor 43 is connected so as to move wiper assembly 1 toward the driver. Direct current (DC) permanent magnet (PM) motors reverse direction when the polarity of the supply current is reversed.

At the start of the cycle, relay 46 is de-energized and normally closed limit switch 45 is open because wiper 1 is physically against it. When momentary push button 47 is closed for a short interval, power flows through de-energized relay 46 contacts through switch 47 and motor 43 starts to turn moving wiper 1 away from limit switch 45. Limit switch 45 reverts to its normally closed state and now creates a current path to motor 43 even after push button 47 is released.

Motion continues toward the driver until limit switch 44 (which is normally open) is closed by having contact with wiper assembly 1. This energizes relay 46 via coil 62, which immediately reverses direction of motor 43. When motion reverses, driver side limit switch 44 soon opens as wiper assembly 1 moves away, but relay coil 62 is maintained in the powered state through a tap at a motor terminal and a path through diode 51. Thus motor 43 continues toward the passenger side until limit switch 45 is "bumped". This interrupts current to the motor and coil 62 simultaneously shutting down the system and preparing the relay 46 contacts for motion in the opposite direction the next time push button 47 is pressed. Diode 51 is required to prevent a short circuit when limit switch 44 is first tripped prior to motor reversal.

The circuit just described provides a single back-and-forth wiper cycle for each short press of the momentary push button.

Figure 6:
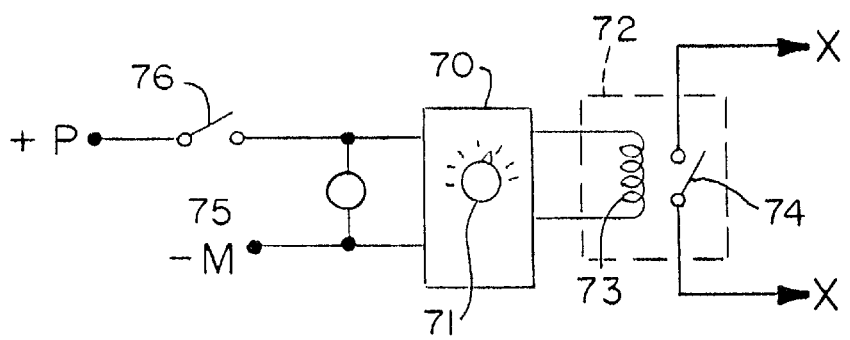
FIG. 6 is a Circuit diagram of the timer feature thereof.

If automatic repetitive cycles are desired, the timer circuit of FIG. 6 can be used as a substitute for push button 47. It is wired in at points P and M and X X of FIG. 5. It is assumed that continuous operation of an interior wiper is not required. Therefore the minimum interval of timer 70 is longer than the back-and-forth cycle duration.

An adjustment knob 71 is provided to adjust electronic timer 70 from a minimum of approximately 15 seconds to 2 minutes or more. An on/off switch 76 which is a rocker or toggle type lights indicator lamp 75 and starts timer 70 which emits second pulses at a continuous rate as selected by dial knob 71. The output of the timer energizes relay 72 by causing current flow for one second thereby closing (normally open) contacts 74 simulating the operation of push button 47 in FIG. 5.

Figure 7:
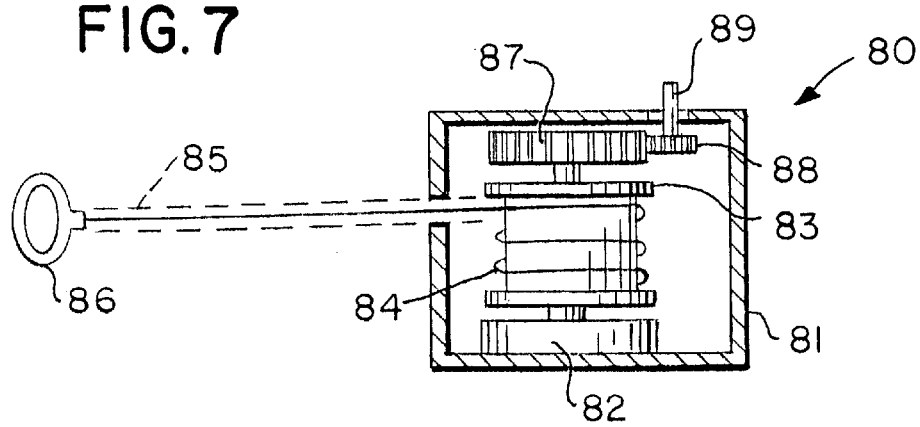
FIG. 7 is a Side view with the housing shown in cross section of an alternate embodiment for a manual drive module.

In an alternate embodiment shown in FIG. 7, the interior wiper feature is manually operated. To make it as convenient for the driver as possible and to maintain the features of the electrically powered version, the manual drive module 80 of FIG. 7 is used instead of motor 43 and the other electrical components.

By pulling handle 86 in any direction for a stroke of about 18 inches (46 cm) wiper assembly 1 moves across to the driver's side from its parked position and returns to the passenger side automatically when handle 86 is released.

Housing 81 contains a spring reel 82 attached to it which powers reel 83 to both rewind cable 84 and return wiper 1 from the driver side to the passenger side. Flexible semi-rigid tubing 85 places handle 86 is a position convenient to the driver. Gear 87 at the output of reel 83 drives smaller gear 88 at a speed 3.5 times that of reel 83. Output shaft 89 is coupled in at FIG. 4 in the same location as motor 43 is shown. Thus the rest of the mechanical system remains the same.

The driver provides energy for both parts of the back-and-forth cycle by pulling cable 84 over a short stroke. This is accomplished by the driver winding up the spring motor while pulling wiper 1 across to his or her side simultaneously through the appropriate gear ratio which multiplies the stroke distance of wiper assembly 1.

It is noted that other changes made be made to the present invention without departing from the scope of the present invention, as noted in the appended Claims.

I claim:

1. A laterally movable wiper arm assembly for cleaning curved interior surfaces of automobile and truck windshields, comprising a generally vertically and axially extending sweepable wiper blade movable on a pair of curved tracks; one of said tracks extending horizontally at a top of the windshield and another of said tracks extending horizontally at a bottom of the windshield, said vertically extending wiper blade movable laterally therebetween, said wiper arm assembly having a rigid wiper arm support being telescoping with respect to its vertically extending axis, said telescoping rigid wiper arm support permitting said vertically extending wiper blade to tilt into respective corners at a bottom of the windshield to cover a larger proportion of the area thereat, wherein said wiper blade is supported with a resilient layer attached to a flexible substrate, which said flexible substrate is adjustably attached to said rigid arm support, said rigid arm support movably following the windshield contour.

2. The windshield wiper arm assembly as in claim 1, wherein said wiper arm is parked at a passenger side when not cycling, to minimize any impediment to driver peripheral view.

3. The windshield wiper arm assembly as in claim 2, wherein said wiper arm assembly is manually operable by a handle.

4. The windshield wiper arm assembly as in claim 1, wherein said wiper blade is a rubber wiper blade.

5. The windshield wiper arm assembly as in claim 1, wherein said wiper blade is an absorbent fabric pad configured into a narrow blade shape.

6. The windshield wiper arm assembly as in claim 1, wherein said wiper arm moves laterally along said tracks in a transverse stroke, said wiper arm tilting out and pivoting slightly both at its respective top and bottom, wherein at an end each transverse stroke, said wiper arm tilts to a maximum angle.

7. The wiper arm assembly as in claim 6, wherein said wiper blade is attached to said resilient layer, said resilient layer being made of resilient foam, which said layer of foam conforms to minor concavity variations as said wiper arm moves laterally across the windshield, said wiper arm having an adjustable, flexible, semi-rigid substrate optimally following the contour of the windshield, to match a concavity of the windshield at a mid-point of said transverse stroke.

8. The laterally movable wiper arm assembly as in claim 6, wherein said upper and lower tracks are u-shaped in crossection, wherein further said telescoping wiper arm support includes an extension attached to a wheeled, pivotable track plate, said track plate movable within said upper track, said track plate attached to a compression spring supported within a cavity of a support bar, said compression spring urging said wiper arm support against said top track and said bottom track, and, said wiper arm support having a wheeled track plate movable within said lower track.

9. The wiper arm assembly as in claim 8, further comprising a power supply motor moving said wiper arm laterally adjacent to and between said upper and lower tracks, said wiper arm support attached by said track plates to respective timing belts within said respective upper and lower tracks, said timing belts movable about respective belt drive pulleys, said pulleys rotatable by a drive shaft driven by said power supply motor.

10. The wiper arm assembly as in claim 9, wherein said power supply motor is a direct current DC permanent magnet (PM) gear motor.

11. The wiper arm assembly as in claim 10, further comprising a first limit switch and a second limit switch, said first limit switch detecting arrival of said wiper arm assembly at an end of said transverse stroke at one side of the windshield, said second limit switch detecting arrival of said wiper arm assembly at an opposite side of the windshield.

12. The wiper arm assembly as in claim 11, further comprising an electrical circuit having a plug operating said wiper arm support from a cigarette lighter outlet, said power supply motor moving said wiper arm in reversible directions when polarity of supply current of said power supply motor is reversed.

13. The wiper arm assembly as in claim 12, further comprising a relay reversing said respective directions of said wiper arm support as said wiper arm support reaches opposite ends of said pair of tracks.

14. The wiper arm support as in claim 13, further comprising a timer energizing said relay by causing current flow for a predetermined time.

15. The wiper arm assembly as in claim 8, further comprising a manually operable spring reel, said spring reel powering a reel rewinding a cable, said cable returning said wiper arm support from a first manually movable position to an opposite storage position along said pair of tracks.

* * * * *